United States Patent [19]

Wood et al.

[11] Patent Number: 4,705,573

[45] Date of Patent: Nov. 10, 1987

[54] DESCALING PROCESS

[75] Inventors: Christopher J. Wood, Mountain View, Calif.; David Bradbury, Tresham; Timothy Swan, Lime Grove; Michael G. Segal, Bristol; Robin M. Sellers, Gloucestershire, all of England

[73] Assignee: Electric Power Research Institute, Inc., Palo Alto, Calif.

[21] Appl. No.: 763,754

[22] Filed: Aug. 6, 1985

Related U.S. Application Data

[63] Continuation of Ser. No. 507,703, Jun. 23, 1983, abandoned, and a continuation-in-part of Ser. No. 221,931, Dec. 31, 1980, abandoned.

[30] Foreign Application Priority Data

Jan. 8, 1980 [GB] United Kingdom ............... 8000584

[51] Int. Cl.$^4$ ........................... C23G 1/02; C23G 1/08
[52] U.S. Cl. ............................... 134/3; 134/13; 134/41; 252/81; 252/626
[58] Field of Search ............... 134/3, 13, 41; 252/81, 252/87, 105, 626

[56] References Cited

U.S. PATENT DOCUMENTS

| 2,450,861 | 10/1948 | Robinson | 252/148 X |
|---|---|---|---|
| 2,981,643 | 4/1961 | Baybarz | 134/3 |
| 3,440,170 | 4/1969 | Hek | 134/3 X |
| 3,664,870 | 5/1972 | Oberhofer et al. | 134/3 |
| 3,686,123 | 8/1972 | Hiroshi | 252/87 |
| 3,773,465 | 11/1973 | Keeney et al. | 134/41 X |
| 3,873,362 | 3/1975 | Mihram et al. | 134/13 X |
| 4,162,229 | 7/1979 | Loewenschuss | 134/3 X |
| 4,226,640 | 10/1980 | Bertholdt | 134/3 |
| 4,402,759 | 9/1983 | Tytgat | 134/3 |
| 4,470,951 | 9/1984 | Bradbury et al. | 134/3 X |

FOREIGN PATENT DOCUMENTS

| 2613351 | 10/1977 | Fed. Rep. of Germany | 252/626 |
|---|---|---|---|
| 43-4163 | 2/1968 | Japan | 134/3 |
| 47-25078 | 10/1972 | Japan | 252/81 |

Primary Examiner—Robert Yoncoskie
Attorney, Agent, or Firm—Flehr, Hohbach, Test, Albritton & Herbert

[57] ABSTRACT

A process for the removal of deposits consisting essentially of the oxides of one or more transition metals from a surface, which process comprises contacting the said surface at a pH in the range of from 2.0 to 7.0 with a reagent comprising a one-electron reducing agent which is the complex formed between a low oxidation state transition metal ion and a complexing agent, for destabilizing the metal oxides deposited, thereby increasing their rate of dissolution, the complexing agent being thermally stable at the operating pH and present in order to form the necessary complex reagent and also to increase the thermodynamic solubility of the metal ions released.

16 Claims, 1 Drawing Figure

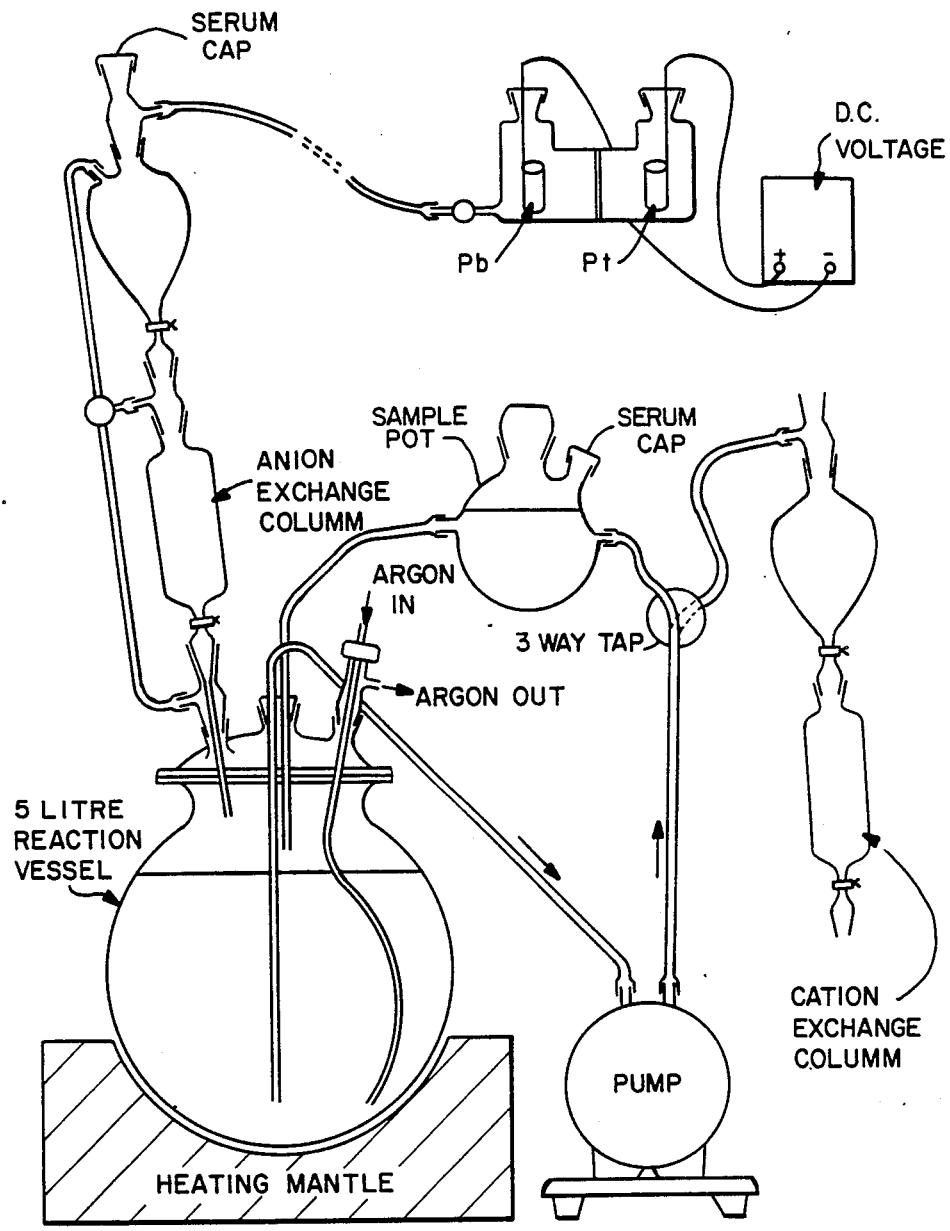
FIG.—1

DESCALING PROCESS

This is a continuation of application Ser. No. 507,703 filed June 23, 1983 and is a continuation-in-part of Ser. No. 221,931 filed Dec. 31, 1980, both now abandoned.

The present invention relates to a process of decontaminating the cooling system or components associated with the cooling system of water cooled nuclear reactors, or other contaminated plant items, using particular decontaminating reagents.

BACKGROUND OF THE INVENTION

The construction materials of water-cooled nuclear reactors are corroded by the aqueous coolant and small amounts of their constituent elements are released into the coolant. These constituent elements become neutron activated in the reactor core and are ultimately deposited in the form of their oxides on the vessel and pipework surfaces throughout the coolant circuits, giving rise to large radiation dose rates in the circuit. It is desirable to remove these surface oxide layers to reduce the radiation dose rates prior to man access.

Water systems containing oxide scales (e.g. boilers) have traditionally been cleaned using acids and complexing reagents. These reagents depend on an elevated hydrogen ion concentration [H$^+$] to attack and destabilise the metal oxide and sometimes employ a complexing agent to increase the thermodynamic solubility of the resulting metal ions. An example of this type of reagent is a mixture of oxalic and citric acids. This type of reagent will dissolve the surface oxide layers formed in the coolant circuits of water-cooled nuclear reactors when used at high concentrations in the range of from 3 to 6% by weight. However, the volumes of coolant circuits are large and this cleaning process gives rise to unacceptably large volumes of radioactive waste. If it were possible to reduce the reagent concentration, then both the reagent and the dissolved radioactive compounds could be removed by ion exchange giving rise to a low-volume, solid waste which can be easily handled. The maximum feasible concentration of reagent for such a process is generally about 0.1% by weight. At this concentration the traditional acidic cleaning reagents dissolve the surface oxide layers in water-cooled reactors unacceptably slowly and an alternative reagent is required.

The major ionic exchange constituent of all surface oxide layers occurring in the circulating coolant of a water-cooled nuclear reactor is Fe$^{III}$ (see Table 1 hereinbelow for details of these oxides and their compositions).

TABLE 1

| Ionic Constituents of Oxides | $Fe_2O_3$ | $Fe_3O_4$ | $Fe_2NiO_4$ | $Fe_{2.25}Cr_{0.15}Ni_{0.6}O_4$ |
|---|---|---|---|---|
| $Cr^{3+}$ | 0 | 0 | 0 | 0.15 |
| $Ni^{2+}$ | 0 | 0 | 1.0 | 0.60 |
| $Fe^{2+}$ | 0 | 1.0 | 0 | 0.40 |
| $Fe^{3+}$ | 2.0 | 2.0 | 2.0 | 1.85 |

Fe$^{3+}$ is the major metal ion in these water reactor deposited oxides ($^{60}$Co and $^{58}$Co, the major sources of radiation dose, are chemically insignificant).

Because it is well known that Fe$^{3+}$ can be reduced to Fe$^{2+}$, previous attempts to improve the performance of acids or chelating reagents have included the addition of reducing agents. In principle such reagents can increase the rate of dissolution of oxides containing Fe$^{3+}$ by the transfer of an electron thereto, converting this ion into Fe$^{2+}$ and thereby destabilising the lattice. Although Fe$^{3+}$ is the major constituent of the surface oxide layers, also Cr$^{3+}$ may also be contained in these oxides and is reduced to Cr$^{2+}$.

We have discovered that not all reducing agents attack the surface oxide layers rapidly, the most effective being those that can transfer a single electron since each Fe$^{III}$ can only readily accept one electron. Of the one-electron reducing agents only those which provide an easy pathway for electron transfer dissolve the surface oxide layers rapidly and examples of these are the oxidation states of certain transition metals. The expression low oxidation state is used herein to imply an oxidation state lower than that which is normally stable with respect to oxidation by air in aqueous solution. We have further discovered that, in order for such a reagent to react with these oxides and cause rapid dissolution, the conditions must be such that a suitable mechanism for the electron transfer exists. We have discovered that rapid dissolution of Fe$^{III}$ oxides by low oxidation state transition metal ions can occur either in strongly acidic solutions, or alternatively in weakly acidic solutions, when the reducing metal ion is present in the form of a complex with a suitable chelating ligand. In strongly acidic solutions, the reaction can be promoted by ions which are capable of acting as bridging ligands in an inner-sphere mechanism, by forming a direct link between the Fe$^{III}$ and the reducing agent; chloride is a typical example of such an ion. Such ions are corrosive to the materials of nuclear reactors and other metals, and strong acids in general are also corrosive. However, we have discovered that complexes formed between chelating ligands and transition metal ions can react rapidly to dissolve Fe$^{III}$ oxides, using an outer-sphere mechanism, in which no direct link is required between oxide and reducing agent. It is well known that such complexes are usually most stable in weakly acidic or neutral solutions. Thus such reagents can be effective under conditions which are not intrinsically harmful to the material to be cleaned.

The complex reducing agent is formed by the combination of a low oxidation-state transition metal ion and one or more chelating ligands; these two components must be selected such that the complex so formed is both a sufficiently strong reducing agent and capable of rapid electron transfer. It is well known that complexes formed between transition metal ions and chelating ligands often have properties very different from those of the metal ions alone. The conditions must also be carefully chosen such that the desired complex is formed, and such that the rate of electron transfer is sufficiently high. In particular, the pH must be neither too low, which would prevent the formation of the complex, nor too high which can slow down the electron-transfer reaction and can also lead to the precipitation of certain metal ions as hydroxides. The choice of chelating agent and conditions must ensure that all the metal ions dissolved in the decontamination process remain in solution, by forming complexes with the ligand. The oxidised product of the decontaminating agent must also remain in solution as a stable complex. It will be clear to those skilled in the art that the conditions, such as the pH and the concentration of ligand, required to satisfy these criteria will depend on the choice of low oxidation-state metal ions and complexing agent. The present invention is based on these findings.

SUMMARY OF THE INVENTION

Accordingly, the present invention provides a process for the removal of deposits consisting essentially of the oxide of one or more transition metals from a surface, which process comprises contacting the said surface at a pH in the range of from 2.0 to 7.0 with a reagent comprising a one-electron reducing agent which is the complex formed between a low oxidation state transition metal ion and a complexing agent, for destabilising the metal oxides deposited thereby increasing their rate of dissolution, the complexing agent being thermally stable at the operating pH and present in order to form the necessary complex reagent and also to increase the thermodynamic solubility of the metal ions released.

It will be appreciated that it is important that any reagent employed in a reactor circuit should result in minimal corrosion of the materials of construction. Corrosion tests have been carried out with $V^{II}$ picolinate in formate or acetate media with a variety of water reactor materials, both with and without the addition of surfactants and corrosion inhibitors. Low corrosion rates have been found in all cases (see Table 2 hereinbelow). The most sensitive material tested was AISI410 (martensitic stainless iron). For comparison, this material corrodes about 50 times faster in a 6% oxalic acid based cleaning reagent than in the $V^{II}$ picolinate reagent for which test results are given in Table 2, even when a corrosion inhibitor, 2-mercaptobenzthiazole, is added to the conventional reagent.

TABLE 2

| METAL | AREA cm$^2$ | pH | SPECIAL CONDITIONS | time h | Wt. loss mg | penetration $\mu$ | Rate $\mu$/h |
|---|---|---|---|---|---|---|---|
| | | | Materials Corrosion in LOMI Reagent (Laboratory Tests) | | | | |
| AISI 410 | 12 | 4.0 | Acetate buffer 0.1 M | 3.5 | 17.0 | 1.7 | 0.5 |
| AISI 410 | 12 | 5.3 | Coupled to AISI 321 Stainless Steel | 5.5 | 11.8 | 1.2 | 0.2 |
| AISI 410 | 12 | 5.2 | $\gamma$-Radiation Field 0.5 M rad/hr; 70° C. | 5.5 | 3.1 | 0.3 | 0.05 |
| AISI 410 | 11 | 4.7 | Tetra-n-butyl Ammonium Hydroxide 20 ppm | 5.5 | 6.8 | 0.7 | 0.1 |
| AISI 410 | 11 | 4.9 | Hyamine* 1622 (Cationic Surfactant) 20 ppm | 6.2 | 0.7 | 0.07 | 0.1 |
| INCONEL 600 | 9 | 4.8 | — | 5 | 0 | 0 | 0 |
| AISI 304 | 10 | 4.8 | — | 5.5 | 0.2 | 0.02 | 0.004 |
| AISI 304 | 10 | 4.9 | 2 MBT** (Corrosion Inhibitor) 10$^{-3}$ M | 6 | 0 | 0 | 0 |
| AISI 321 | 10 | 4.9 | — | 5 | 0 | 0 | 0 |
| ZIRCALOY-2 | 12 | 4.7 | — | 5.5 | 0.1 | 0.01 | 0.002 |
| EN2 CARBON STEEL | 10 | 5.4 | [Pic] 3.4 × 10$^{-2}$ M, [Formate] 10$^{-2}$ M | 5.1 | 22.6 | 2.5 | 0.49 |
| INCOLOY 800 | 10 | 5.4 | [Pic] 3.4 × 10$^{-2}$ M; [Formate] 10$^{-2}$ M | 5.1 | 0 | 0 | 0 |

GENERAL CONDITIONS: 80° C. $[V^{II}] = 4 - 5 \times 10^{-3}$ M: Total [Pic] $= 2 \times 10^{-2}$ M: [Formate] = 0,1 M
*HYAMINE is a Registered Trade Mark
**2MBT is an abbreviation for 2-mercaptobenzothiazole

BRIEF DESCRIPTION OF THE DRAWING

Sole FIG. 1 is a diagrammatic illustration of a five-liter decontamination apparatus with recirculation utilized to perform one of the examples (Example 2) herein.

DETAILED DESCRIPTION OF THE INVENTION

The reagent used in the present invention is a separate and distinct complex formed between the said low oxidation state transition metal ion and the said complexing agent. These decontaminating reagents are by certain specialists in this field referred to as "LOMI" reagents (low oxidation-state metal ion reagents). It is recognised by these specialists that the name LOMI refers to the separate and distinct complex entity consisting of the metal ion chemically bonded to one or more complexing ligands. In order to employ these reagents in a nuclear reactor it is necessary to maintain the pH above 2, preferably above 3.5, in order to ensure the formation of the desired complex and to minimise the corrosion of the cleaned base metal during the dissolution of the deposited oxide. It is also necessary to maintain the pH below 7, in order to ensure rapid reaction between the decontaminant and the oxide, and to prevent precipitation of metal hydroxides. It is also necessary to ensure that no corrosive anions, such as chloride or sulphate, are present. These conditions are all satisfied by the use of certain weak-acid anions such as formate or acetate as counter-ions to the low oxidation-state metal ion component of the complex. Preferably, the complexing agent if used with $Cr^{II}$ promotes spin pairing.

The decontaminating reagents of the present invention are suitable for use at concentrations in the range of from 10$^{-3}$ to 2M, preferably in the range of from 10$^{-3}$ to 10$^{-2}$M. The decontaminating reagents are used at a pH between 2 and 7, preferably in the range of from 3.5 to 6.0 and are generally used at a temperature in the range of from ambient to 200° C., preferably in the range of from 60° to 95° C. The molar concentration of the complexing agent is generally from 3 to 10 times the molar concentration of $V^{II}$ or $Cr^{II}$. When formate or acetate is present as the counterion in the decontamination reagents used in the process of the invention they are generally employed at a molar concentration of from 5 to 20 times the molar concentration of $V^{II}$ or $Cr^{II}$.

As mentioned above the complexing agent which is used in the decontaminating reagents of the invention must, in use of the reagent, maintain all metal ions present in solution at pH of up to 7.0. It is beneficial if the complexing agent promotes spin pairing when used with $Cr^{II}$ so that the $Cr^{II}$ ion will undergo rapid outer-sphere electron transfer reactions, and should not lower the redox potential of the system to a value such that the rate of water reduction can compete with the dissolution process. It will also be appreciated by those skilled in the art that the complexing agent must have an adequate radiation stability, if it is to be used in the core of a nuclear reactor.

Examples of suitable complexing agents are ethylene diamine tetra-acetic acid, citric acid, picolinic acid, nitrilotriacetic acid, 2,6-dicarboxypyridine and 2,2'-bipyridyl. Although 2,2'-bipyridyl does show some sensitivity to radiation and is therefore not suitable for use in decontaminating reagents for use in-core regions, it is suitable for use for component and out of core decontaminations where radiation does rates are $10^4$ to $10^5$ times smaller.

Specific examples of the decontaminating reagents for use in the invention are a one electron reducing agent based on the complex formed between $V^{II}$ and picolinic acid and a one electron reducing agent based on the complex formed between $Cr^{II}$ and bipyridyl.

In both of these examples the complexes formed in the presence of sufficient ligand are the tris-complexes, with three chelating ligands attached to each low oxidation-state metal ion. These tris-complexes are the effective decontaminating agents in these specific examples; those skilled in the art often write these complexes as $[V(pic)_3]^-$ and $[Cr(bipy)_3]^{2+}$ respectively.

It has been found that when formate is present as the counter-ion, radiation will regenerate the low oxidation states $V^{II}$ and $Cr^{II}$ in the complexes. The reaction sequence is as follows, using $V^{II}$ as an example; the symbol L is used to represent a suitable chelating ligand, such as picolinate.

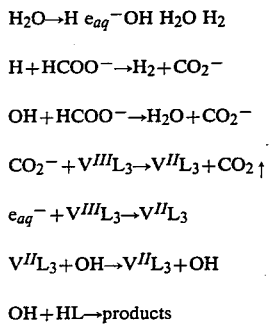

$$H + HCOO^- \rightarrow H_2 + CO_2^- \qquad 1$$

$$OH + HCOO^- \rightarrow H_2O + CO_2^- \qquad 2$$

$$CO_2^- + V^{III}L_3 \rightarrow V^{II}L_3 + CO_2 \uparrow \qquad 3$$

$$e_{aq}^- + V^{III}L_3 \rightarrow V^{II}L_3 \qquad 4$$

$$V^{II}L_3 + OH \rightarrow V^{III}L_3 + OH \qquad 5$$

$$OH + HL \rightarrow products \qquad 6$$

As long as the concentration of $HCOO^-$ is sufficiently high to compete with $V^{II}$ and picolinate in reactions (5) and (6), the overall reaction is to reduce $V^{III}$ to $V^{II}$, thereby regenerating the low oxidation-state metal ion reagent.

Whilst the preferred $Cr^{III}$ bipyridyl reagent is radiation unstable, under certain circumstances $Cr^{II}$ can be used with other ligands when the regeneration of $Cr^{II}$ may occur.

Low oxidation-state metal in components of reagents used in the process of the invention may be prepared in concentrated form (e.g. up to 2M) by a number of methods. Examples of such methods are:

(i) The reduction of $Cr^{II}$ or $V^{IV}$ as the sulphate or perchlorate under an inert atmosphere using either zinc amalgam or a standard electrochemical method. The latter method employs either a lead or mercury cathode while a platinum or other anode is immersed in the corresponding acid at the same concentration. The amalgam method leads to a solution containing dissolved zinc and the electrochemical method is therefore preferred. Since $SO_4^{2-}$ and $ClO_4^-$ are not desirable in the reactor they are exchanged for either formate or acetate ion by passage of the reduced solution through an anion-exchange resin in the appropriate form; and (ii) in the case of $V^{II}$ formate preparation, the ion-exchange step can be eliminated by direct electrolytic reduction of a suspension of $V_2O_5$ in formic acid. As the $V^V$ is reduced, the suspension is taken into solution. This has the advantage that the danger of contamination by other anions is much reduced.

The formation of the desired complex occurs by the reaction of the complexing agent with the metal ion component. Such reactions are normally rapid with either $V^{II}$ or $Cr^{II}$. Thus the decontaminating agent is prepared by the addition of a solution of the $V^{II}$ or $Cr^{II}$ component to a solution containing the complexing agent and any other reagent that may be necessary, for example, an alkali to obtain the desired pH. The decontaminating agent can be prepared in this way either in a suitable vessel prior to the decontamination, or in situ in contact with the component or circuit to be cleaned.

The said component or circuit is then exposed to the decontaminating agent for the time necessary to achieve the desired decontamination, generally between one and ten hours.

After carrying out the process of the invention, the reagents and activity are removed from the process solution by ion exchange. Passage through a strong acid ion exchange resin removes >99% of the activity and most of the complexing reagent. The remainder of the decontaminating reagent is removed by passage of the liquids through an anion exchange resin. This process concentrates the activity from the contaminated pipework into a small volume of solid cation exchange resin.

The present invention will be further described with reference to the following Examples.

EXAMPLE 1

Synthetic reactor oxide powders of the composition given in Table 1 above were prepared and used as standards against which different decontaminating reagents were compared. These oxides were dissolved both in the reagents of this invention and also in conventional reagents for the purposes of comparison.

With the reagents of this invention the tests were carried out by placing a weighed amount of the oxide powder in a solution containing the complexing agent and any other reagent required (for example, acetate or formate buffer or sodium hydroxide) in a suitable glass vessel of approximately 100 $cm^3$ capacity, and heating to the required temperature while degassing with nitrogen or oxygen. The solution was stirred with a magnetic stirrer. The low oxidation-state metal ion component of the reagent was then injected. Samples of the solutions were withdrawn at suitable time intervals and analysed for the presence of dissolved metals.

The dissolution reaction was found to follow cubic kinetics, i.e., the rate was proportional to the surface area of approximately spherical particles and this allowed the determination of the time for complete dissolution of the powdered samle ($t_{28}$). The smaller the value $t_{28}$ the more rapid the dissolution reaction. Values of $t_{28}$ for different reagents are compared in Tables (3) and (4) for dissolution by acids and chelants alone and dissolution by the reagents of the invention. In all cases, the one-electron reducing agents based on the complexes between low oxidation-state metal ions and chelating ligands dissolve the oxides faster than do the conventional reagents, even when the complex reducing agent is employed at a concentration ten to a hundred times lower.

TABLE 3

Oxide Dissolution with Acids and Chelating Agents only

| Reagent | Concentration (M) | [H+] (M) | T °C. | Dissolution time $t_\infty$ (min) $Fe_2O_3$ (350) | $Fe_2NiO_4$ | $Fe_3O_4$ |
|---|---|---|---|---|---|---|
| EDTA | 0.1 | $10^{-7}$ | 60 | $3 \times 10^5$ | — | — |
| EDTA | 0.1 | $10^{-5}$ | 60 | $1.5 \times 10^4$ | $\geq 2 \times 10^6$ | $2 \times 10^4$ |
| EDTA | Sat. | $10^{-3}$ | 60 | $10^4$ | — | — |
| Citrate/Oxalate | Both 0.1 | $10^{-6.5}$ | 60 | $>10^6$ | — | $10^5$ |
| Citrate/Oxalate | Both 0.1 | $10^{-5}$ | 60 | $3.5 \times 10^5$ | $>2 \times 10^6$ | — |
| Citrate/Oxalate | Both 0.1 | $10^{-3}$ | 60 | $10^4$ | — | $2.5 \times 10^3$ |
| Citrate | 0.5 | $10.^{-3.5}$ | 80 | — | $5 \times 10^4$ | — |
| Bipyridyl | 0.01 | $10^{-2.5}$ | 60 | $>4 \times 10^5$ | — | — |
| Catechol | 0.1 | $10^{-3}$ | 80 | $\geq 10^4$ | — | — |
| $H_2SO_4$ | 2.15 | 4.3 | 60 | 360 | $6 \times 10^5$ | $1.3 \times 10^4$ |
| HCl | 0.1 | 0.1 | 60 | $1.7 \times 10^4$ | $\geq 2 \times 10^6$ | $10^4$ |
| HCl | 1.0 | 1.0 | 60 | 240 | $8 \times 10^5$ | $10^3$ |

The Figure 350 which appears in brackets in the above Table and Table 4 refers to the calcining temperature of the oxide in degrees Centigrade.

TABLE 4

Oxide Dissolution with Reducing Agents

| Reductant | Conc. (M) | Other Reagent | Conc. (M) | H+ (M) | T °C. | $Fe_2O_3$ (350) | $Fe_2NiO_4$ | $Fe_3O_4$ | $Fe_{2.25}Cr_{0.15}Ni_{0.6}O_4$ |
|---|---|---|---|---|---|---|---|---|---|
| $Cr^{2+}$ | 0.001 | Bipyridyl | 0.005 | $10^{-3}$ | 23 | 50 | — | — | — |
| $Cr^{2+}$ | 0.002 | Bipyridyl | 0.02 | $10^{-6}$ | 60 | 70 | $1.4 \times 10^4$ | — | — |
| $Cr^2$ | 0.004 | Bipyridyl | 0.02 | $10^{-5.2}$ | 80 | — | 500 | — | — |
| $V^{2+}$ | 0.002 | Bipyridyl | 0.01 | $10^{-4.5}$ | 80 | 150 | — | — | — |
| $V^{2+}$ | 0.004 | Bipyridyl | 0.02 | $10^{-4.6}$ | 80 | — | $2.3 \times 10^3$ | — | — |
| $V^{2+}$ | 0.002 | Picolinate | 0.01 | $10^{-4.1}$ | 60 | 25 | 600 | — | — |
| $V^2$ | 0.0017 | Picolinate | 0.01 | $10^{-5.1}$ | 80 | <10 | 300 | <10 | — |
| $V^2$ | 0.0017 | Picolinate | 0.01 | $10^{-5.6}$ | 80 | — | 730 | $\leq 10$ | 3000 |
| $Cr^{2+}$ | 0.0036 | NTA* | 0.02 | $10^{-4.1}$ | 80 | <10 | $\leq 30$ | — | 50 |

*NTA = Nitrilotriacetic acid

EXAMPLE 2

In order to go through all the processes necessary to use low oxidation-state metal ion reducing agents as reactor decontaminating agents, a five liter scale apparatus was constructed in which the reagent was prepared, circulated over a contaminated pipework sample which had been removed from a reactor, and the dissolved activity and reagents thereafter removed from the process liquid by ion exchange. This apparatus is illustrated in FIG. 1.

The low oxidation state metal ion $V^{II}$ was prepared electrochemically from $V^{IV}$ as the sulphate. The 5 liter vessel (corresponding to the circuit to be cleaned) was filled with a solution of picolinic acid at the required concentration containing sufficient sodium hydroxide to obtained the desired pH, and de-aerated and heated to the desired temperature. Sufficient of the metal-ion component was then added that enough of the complex reagent was formed to react with the quantity of oxide to be dissolved. The concentration of the decontaminating agent was $2.4 \times 10^{-3}$M, and the total ligand concentration was sufficient to complex the vanadium and all the metals dissolved in the process.

Samples of contaminated reactor pipework fabricated in stainless steel and mild steel were decontaminated in the 5 liter scale vessel using the $V^{II}$ picolinate decontaminating reagent with acetate counter-ion. The conditions of these decontaminations and the decontamination factors achieved are given in Table 5. These reagents dissolve the water-cooled reactor oxide deposits at rates comparable to conventional reagents employed at 100 times the concentration. Runs 6 to 9 are given for comparison purposes.

TABLE 5

Decontamination of Reactor Exposed Specimens in 5 Liter Scale Apparatus

| Run No. | Sample | Concentrations | Conditions | Time min | Decontamination Factor* |
|---|---|---|---|---|---|
| 1 | 321 Stainless Steel | $V^{II}$ $2 \times 10^{-3}$ M<br>Picolinate $1 \times 10^{-2}$ M | Temp = 80° C.<br>pH $\approx$ 5 | 750 | 6.5 |
| 2 | 321 Stainless Steel | $V^{II}$ $4 \times 10^{-3}$ M<br>Picolinate $2 \times 10^{-2}$ M | Temp = 80° C.<br>pH = 5.2 | 690 | 35 |
| 3 | Mild Steel | $V^{II}$ $4 \times 10^{-3}$ M<br>Picolinate $1.5 \times 10^{-2}$ M | Temp = 80° C.<br>pH = 6.0 | 2710 | 7 |
| 4 | Mild Steel | $V^{II}$ $4 \times 10^{-3}$ M<br>Picolinate $1.5 \times 10^{-2}$ M | Temp = 80° C.<br>pH = 5.3 | 700 | 6.5 |
| 5 | Mild Steel | $V^{II}$ $4 \times 10^{-3}$ M<br>Picolinate $2 \times 10^{-2}$ M | Temp = 80° C.<br>pH = 5.2 | 450 | 6 |
| **6 | Mild Steel | Citric Acid $2 \times 10^{-3}$ M<br>Oxalic Acid $3 \times 10^{-3}$ M<br>EDTA $3 \times 10^{-3}$ M<br>Wetting Agent Trace<br>Ammonia to ~pH 4 | Temp = 80° C.<br>pH = 3.85 | 327 | 2.4 |
| **7 | Mild Steel | Picolinate $1.5 \times 10^{-2}$ M | Temp = 80° C.<br>pH = 5.8 | 705 | 2.4 |

TABLE 5-continued

| Run No. | Sample | Concentrations | Conditions | Time min | Decontamination Factor* |
|---|---|---|---|---|---|
| **8 | 321 Stainless Steel | Oxalate 3.6%<br>Citrate 0.5%<br>Ammonia to pH~4<br>Corrosion Inhibitor 0.003%<br>Wetting Agent 0.006% | T = 80° C.<br>pH 3.7 | 1350 | 10 |
| **9 | Mild Steel | As (8) above except:<br>Ammonia to pH~3 | T = 80° C.<br>pH 3.0 | 375 | 2.5 |
| **10 | 321 Stainless Steel | Citric Acid 1 × $10^{-2}$ M<br>EDTA 1 × $10^{-3}$ M<br>Wetting Agent Trace<br>Oxalic Acid 2.7 × $10^{-2}$ M<br>HEDTA 5 × $10^{-4}$<br>Ammonium to pH 4 | Temp = 80° C.<br><br><br><br><br>pH 3.0 | 1350 | 4 |

*Decontamination Factor = Dose rate before decontamination
**Comparative Examples = Dose rate after decontamination

EXAMPLE 3

The north coolant circuit of the Steam-Generating Heavy Water Reactor (SGHWR) at Winfrith was decontaminated with one of the reagents of this invention, the trispicolinatovanadium (II) complex $[V(pic)_3]^{-b}$. 500 Kg of picolinic acid were dissolved in approximately 30 m$^3$ of water at 90° C., with sodium hydroxide to neutralise the acid, and de-aerated with nitrogen. This solution was pumped into the North circuit of the SGHWR, while a solution containing approximately 30 Kg of vanadium as $V^{2+}$ in formic acid solution, was simultaneously pumped in. When the injection of reagents was complete, the solution of the complex decontaminating agent formed therefrom was circulated through the North circuit of the reactor by the main coolant pumps. When analysis of the solution showed that dissolution of iron and active nuclides had essentially ceased (some 70 minutes after the start of circulation), circulation of the reagent was halted and the circuit drained and rinsed several times. This process was then repeated, using 300 Kg of picolinic acid and 20 Kg of vanadium to make the decontaminating agent in the way described above and circulating this decontaminating agent for approximately 190 minutes. A total of 25.9 Kg of iron was dissolved in these two applications of the reagent, together with smaller amounts of other metals, such as chromium and nickel. 655 Ci of $^{60}$Co were dissolved, with many other radionuclides in smaller amounts. The decontamination factors around this circuit of the reactor varied from an average of 3.4 in areas where there had been a high proportion of deposited oxides to an average of 1.3 in the area where the proportion of deposited oxide had been lowest.

It will be understood that the process of the invention may be used either by itself or in combination with other established cleaning reagents. For example, treatment with the decontaminating reagent of the invention might be preceded by a potassium permanganate pre-oxidation step.

It will be appreciated by those skilled in the art that the decontaminating reagents used in the process of the invention are oxygen sensitive and must therefore be used under an inert atmosphere.

We claim:

1. A process for the removal of deposits consisting essentially of the oxides of one or more transition metals from a surface, which process comprises contacting the said surface at a pH in the range of from 2.0 to 7.0 with a reagent comprising a one-electron reducing agent which is the complex formed between a low oxidation state transition metal ion and a complexing agent, for destabilizing the metal oxides deposited, thereby increasing their rate of dissolution, the complexing agent being thermally stable at the operating pH and present in order to form the necessary complex reagent and also to increase the thermodynamic solubility of the metal ions released.

2. A process for decontaminating the cooling system or a component associated with the cooling system of a water-cooled nuclear reactor, or contaminated plant items of certain deposited contaminants, which process comprises circulating a decontaminating reagent at a pH in the range of from 2.0 to 7.0 through the cooling system of the reactor, or contacting a component associated with the cooling system or containing other contaminated plant items with a decontaminating reagent at a pH in the range of from 2.0 to 7.0, the decontaminating reagent comprising a one-electron reducing agent which is a complex formed between a low oxidation state transition metal ion and a complexing agent for destabilizing said certain contaminants deposited, thereby increasing their rate of dissolution, the complexing agent being thermally stable at the operating pH and present in order to form the necessary complex reagent and also to increase the thermodynamic solubility of the contaminants released.

3. A process as claimed in claim 1 or claim 2 wherein the reducing agent is based on $Cr^{II}$ or $V^{II}$.

4. A process as claimed in claim 1 or claim 2 wherein the reducing agent is one based on $Cr^{II}$ and wherein the complexing agent when used with $Cr^{II}$ promotes spin pairing.

5. A process as claimed in claim 1 or claim 2 wherein the complexing agent is ethylene diamine tetra-acetic acid, citric acid, picolinic acid, 2,2'-bipyridyl, nitrilotriacetic acid or 2,6-dicarboxy pyridine.

6. A process as claimed in claim 1 or claim 2 which comprises a one-electron reducing agent based on the triscomplex formed between $V^{II}$ and a sufficient amount of picolinic acid as the complexing agent.

7. A process as claimed in claim 1 or claim 2 which comprises a one-electron reducing agent based on the tris-complex formed between $Cr^{II}$ and a sufficient amount of bipyridyl as the complexing agent.

8. A process as claimed in claim 1 or claim 2 wherein the decontaminating reagent is used as a temperature in the range of from ambient temperature to 200° C.

9. A process as claimed in claim 6 wherein the decontaminating reagent is used at a temperature in the range of from 60° to 95° C.

10. A process as claimed in claim 1 or claim 2 wherein the concentration of the one-electron reducing agent based on $V^{II}$ or $Cr^{II}$ in the decontaminating reagent is in the range of from $10^{-3}$ to 2M.

11. A process as claimed in claim 10 wherein the concentration of the one-electron reducing agent based on $V^{II}$ or $Cr^{II}$ in the decontaminating reagent is in the range $10^{-3}$ to $10^{-2}$M.

12. A process as claimed in claim 1 or claim 2 which is carried out at a pH in the range of from 3.5 to 6.

13. A process as claimed in claim 1 or claim 2 wherein the molar concentration of the complexing agent is from 3 to 10 times the molar concentration of $V^{II}$ or $Cr^{II}$.

14. A process as claimed in claim 1 or claim 2 wherein formate or acetate is present as a counterion at a molar concentration of from 5 to 20 times the molar concentration of $V^{II}$ or $Cr^{II}$.

15. A process as claimed in claim 14 wherein formate is present as the counterion, in which process the low oxidation state $V^{II}$ of vanadium or the low oxidation state $Cr^{II}$ of chromium is regenerated by radiation during the decontamination process.

16. A process as claimed in claim 1 or claim 2 wherein after treatment of the cooling system, or a component associated with the cooling system or other contaminated plant items, the decontaminating reagent is subjected to treatment with an ion exchange resin to remove the radioactivity therefrom.

* * * * *